April 19, 1927.

A. S. PINKUS 1,625,330

RODIOCONDENSER

Filed April 10, 1925    2 Sheets-Sheet 1

INVENTOR.
Abraham S. Pinkus
BY
M. A. Loughridge
ATTORNEY.

April 19, 1927.

A. S. PINKUS

RODIOCONDENSER

Filed April 10, 1925

1,625,330

2 Sheets-Sheet 2

INVENTOR.
Abraham S. Pinkus
BY
ATTORNEY.

Patented Apr. 19, 1927.

1,625,330

UNITED STATES PATENT OFFICE.

ABRAHAM S. PINKUS, OF NEW YORK, N. Y.

RADIOCONDENSER.

Application filed April 10, 1925. Serial No. 22,230.

Figures 1, 2:
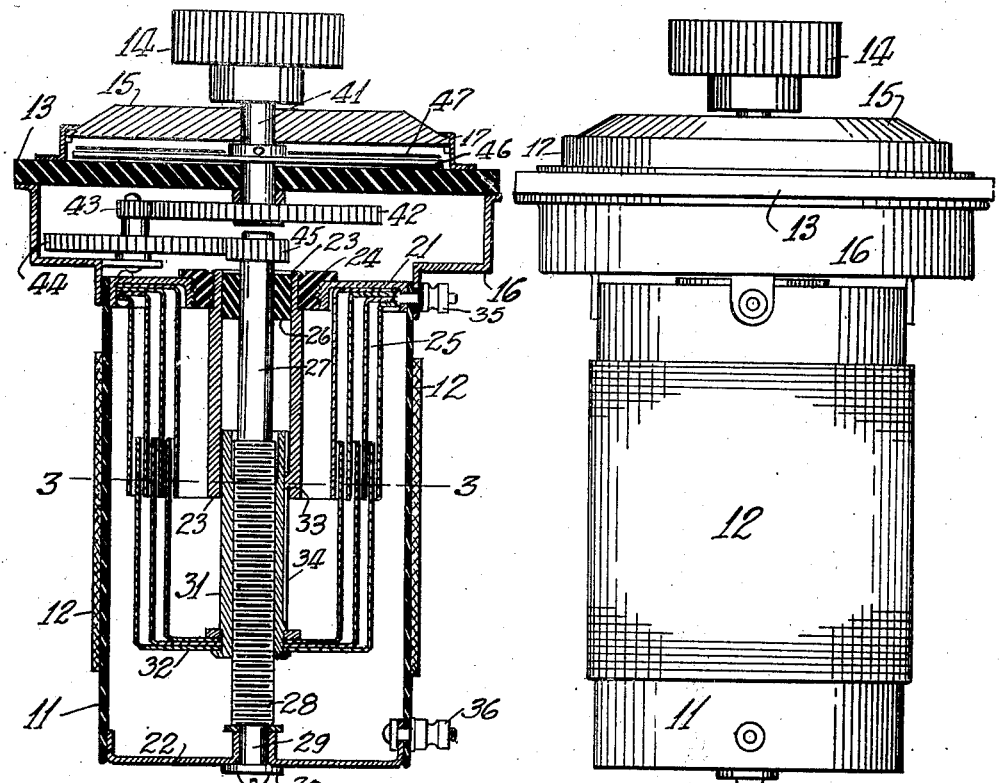
Figure 3:
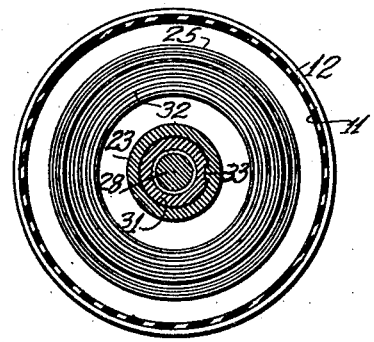
Figure 4:
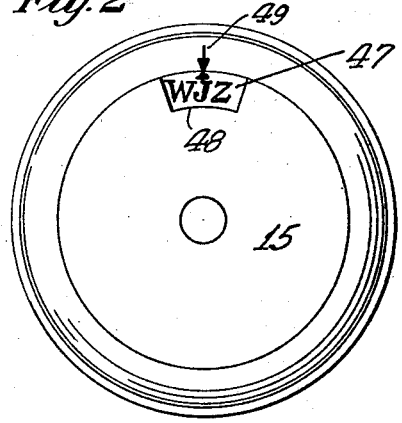
Figure 5:
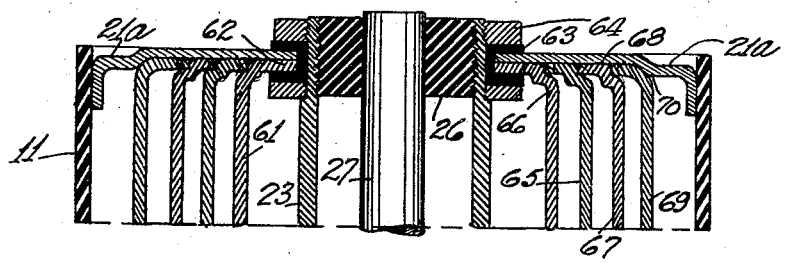
Figure 6:
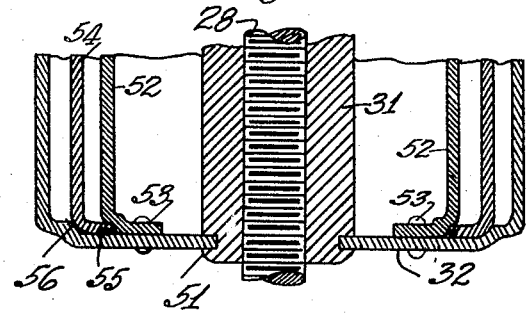

This invention relates to electrical condensers such are are commonly used in radio apparatus and has for an object to provide condensers of this type which are rugged, cannot readily warp out of shape and which has a relatively large capacity for the superficial dimensions of the device. The invention comprises the use of cylindrcal plates in a condenser which have a relative movement laterally to each other and which are guided by a sleeve and stem and adjusted by a screw staff on the longitudinal axis of the device. The invention also comprises a novel method of indexing on a dial the proper adjustment of the condenser for any particular receiving circuit. Other features of novelty reside in the details of the device and the method of construction as more particularly described in the following specification and shown in the accompanying drawings, in which, Fig. 1, is a sectional elevation of a condenser constructed according to my invention, Fig. 2 is an elevation of the device complete, Fig. 3 is a cross section on line 3—3 of Fig. 1, Fig. 4 is a plan view of the dial and indexing arrangement, Fig. 5 shows in detail one method of manufacture and assembly of the cylindrical plates of the condenser, the drawing being in section, and Fig. 6 is a sectional drawing of one type of movable element using cylindrical plates arranged to coact with the arrangement shown in Fig. 5.

The present invention comprises a cylindrical housing closed at both ends to exclude dust and to protect the condenser elements. The condenser elements are cylindrical in shape being made, preferably, from drawn tubing. The fixed element is secured to one end of the housing and the movable element is arranged to move laterally or on the line of the longitudinal axis of the cylindrical elements, the condenser plates passing telescopically within each other. This not only increases the electro-static capacity of the condenser for its size but also the cylindrical plates are always rigid and cannot warp out of shape which is a common defect with the flat plate type of condenser. To insure perfect alignment of the cylindrical plates a fixed sleeve is provided concentric with the fixed plates and a stem is provided concentric with the movable plates. The stem snugly engages the sleeve and slides therein and thereby the elements of the condenser are maintained in alignment. The position of the stem is adjusted by a screw shaft passing through its centre and which helps to maintain the various elements of the device in alignment.

The cylindrical plates are preferably made from drawn tubing formed with a flanged base, the flange being used as a means of supporting the tube sections. When a plurality of plates are used the flanges are arranged to overlap each other whereby the cost of assembly is facilitated.

Adjustable condensers are one of the chief features for tuning a radio set. The common practice is to provide a dial with a number of figures or marks and to make a note of the position in which a particular station is received. In practice, however, the actual adjustment is influenced by a number of conditions which may require a change in adjustment for any particular station. Thus, changing the antenna wire, or even changing the location of the set will influence the required adjustment of the condenser. The indexing arrangement in the present invention is changeable and is placed on a dial to conform to the conditions and location of the apparatus so that adjustment for any station may be made without confusion.

Referring to the drawings, 11 is the outer casing of insulating material, preferably vulcanized fibre, 12 is a tuning coil of a radio set that may be placed on 11. It will be noted that 11 is comparatively long and small in diameter and is thus well adapted for receiving a tuning coil. The device is secured to a panel 13 and is operated by the knob 14. An outer stationary panel 15 encloses the indexing dial and a casing 16 houses the operating gears connecting the knob with the movable element.

The casing 11 is enclosed at the top end by the disc 21 and at the bottom end by the disc 22. An insulating bushing 24 supports the sleeve 23 concentric with the axis of the cylinder. The cylindrical condenser plates 25 are arranged concentrically about the sleeve 23 and are supported by the disc 21.

The screw shaft 27 passes through an insulating bushing 26 is threaded at the lower end 28 and has a bearing in the socket 29 in the bottom disc 22. This shaft is held in place by the washer 30.

The stem 31 of the movable element of the condenser is threaded on 28 and moves vertically on the shaft 27. This stem is provided with a longitudinal key-way 34 which is engaged by the key 33 integral with the sleeve 23 so that the stem can move freely in the sleeve but cannot rotate on shaft 27. The cylindrical plates 32 are clamped on the end of the stem as shown and move telescopically between the fixed plates 25 as the shaft 27 is rotated.

Electrical connection is made to the fixed plates 25 through the binding post 35 and electrical connection is made to the movable plates through the stem 31, shaft 28, socket 29 and end disc 22 to binding post 36. The arrangement of the insulation of the parts may be varied as desired, for instance, the stem 31 may be insulated from the movable plates 32 similar to the insulation of the sleeve 23 and the plates 32 may be connected to the binding posts 36 by a flexible connection.

The shaft 41 operated by knob 14, through gears 42, 43, 44 and 45 rotates the screw shaft 27. The ratio of the gear is such that one turn of the knob moves stem 31 for its entire distance, turning the knob in one direction bringing the condenser elements together and turning the knob in the opposite direction moves the elements apart. On shaft 41 a disc 46 is fixed to rotate therewith and upon this disc is mounted another disc of paper, celluloid or similar material 47 which can be readily marked with a pencil and which is easily replaceable when the outer panel 15 is removed from the supporting ring 17. The panel 15 is provided with a window or opening 48, Fig. 4 through which the disc 47 is exposed. A fixed index line 49 is provided on 15 and when the proper adjustment for a station has been found a mark is made on 47 opposite 49 and the name of the station written below as indicated by the letters "W J Z". When the device is changed so as to require a different adjustment for this station, the previous adjustment is erased and a new adjustment is made as required and noted on the dial 47 for subsequent use. This permits of accurate tuning for local conditions.

The cylindrical plates are preferably made as shown in Figs. 5 and 6. The outer cylinder is formed with a flanged base as 32 which is spun into a groove in the stem 31. The next cylinder 54 is engaged at 56 by the shoulder on 32 and is engaged by the next cylinder 52 at 55. Cylinder 54 is thus held in place by the overlapping of the base of 52 and 52 is held in place by the rivets 53 through its flange.

The fixed plates are supported by the disc 21ª which has a shoulder at 70 engaging cylinder 69. The flange of 69 is engaged by 67, the flange of 67 is engaged at 68 by 65 and the flange of 65 is engaged at 66 by 61. The flange of 61 and the disc 21ª are clamped by nut 64 and insulation 63 to the sleeve 23. This forms a rigid, self-aligning and comparatively inexpensive construction, in the assembly of cylindrical plates.

While the preferred embodiment of my invention, as described, contemplates the use of drawn tubing for the cylindrical plates of the condenser, in certain constructions it may be desirable to make these plates by the process of die casting in which case the fixed element would be moulded from one piece and the movable element would be moulded from one piece while the same general construction and operation of the parts would be maintained throughout.

Having thus described my invention, I claim:

1. In a condenser as described, the combination of a cylindrical shell, a central sleeve in said shell, a bushing of insulation connecting said sleeve with said shell, a plurality of cylindrical plates fixed at one end of said cylinder, a stem sliding in said sleeve, a plurality of cylindrical plates supported by said stem and arranged to move laterally with respect to said fixed plates and a screw shaft in the axis of said cylinder upon which said stem screws back and forth.

2. In a condenser as described, the combination of a fixed disc supporting a plurality of flanged cylinder blades, a sleeve in the center of said disc, a bushing of insulation connecting said sleeve with said disc, a movable member with a stem engaging said sleeve, and a purality of cylindrical blades supported by said stem and arranged to move laterally with respect to said first mentioned blades.

3. In a condenser as described, the combination of a fixed member having a cylindrical plate with a sleeve in its longitudinal center and a movable member comprising a cylindrical plate and a stem sliding in said sleeve, a key way and a key connecting said stem and sleeve, said stem threaded on a central shaft for lateral adjustment.

Signed at New York in the county of New York and State of New York this 16th day of March A. D. 1925.

ABRAHAM S. PINKUS.